United States Patent
Onoda et al.

(10) Patent No.: US 7,680,808 B2
(45) Date of Patent: Mar. 16, 2010

(54) TRANSMISSION APPARATUS, CONTENT REPRODUCTION APPARATUS, AND CONTENT AND LICENSE DISTRIBUTION SYSTEM

(75) Inventors: Sen'ichi Onoda, Toyonaka (JP); Ryuichi Okamoto, Kadoma (JP); Kouji Miura, Matsubara (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 10/568,284

(22) PCT Filed: Jan. 18, 2005

(86) PCT No.: PCT/JP2005/000809

§ 371 (c)(1),
(2), (4) Date: Feb. 15, 2006

(87) PCT Pub. No.: WO2005/073869

PCT Pub. Date: Aug. 11, 2005

(65) Prior Publication Data

US 2008/0195573 A1 Aug. 14, 2008

(30) Foreign Application Priority Data

Jan. 29, 2004 (JP) ............................. 2004-021068

(51) Int. Cl.
*G06F 17/00* (2006.01)
(52) U.S. Cl. .......................... 707/102; 707/10; 707/101; 707/103 Y; 707/104.1; 707/9
(58) Field of Classification Search ................... 707/10, 707/202, 9, 104.1; 705/26, 59; 726/26; 713/163; 380/285, 210; 386/46; 725/32; 352/1
See application file for complete search history.

(56) References Cited

U.S. PATENT DOCUMENTS

| 7,103,663 | B2 * | 9/2006 | Inoue et al. | 709/225 |
|---|---|---|---|---|
| 7,191,332 | B1 * | 3/2007 | Pankajakshan et al. | 713/163 |
| 2001/0044781 | A1 * | 11/2001 | Shutes | 705/59 |
| 2002/0055854 | A1 | 5/2002 | Kurauchi et al. | |
| 2002/0145702 | A1 * | 10/2002 | Kato et al. | 352/1 |
| 2003/0007646 | A1 * | 1/2003 | Hurst et al. | 380/285 |
| 2003/0012548 | A1 * | 1/2003 | Levy et al. | 386/46 |

(Continued)

FOREIGN PATENT DOCUMENTS

EP 1 122 950 8/2001

(Continued)

*Primary Examiner*—Thuy N Pardo
(74) *Attorney, Agent, or Firm*—Wenderoth, Lind & Ponack, L.L.P.

(57) ABSTRACT

A transmission apparatus includes a license data input unit accepting an input of license data which permits reproduction of a storage content linked from a streaming content; a multiplexer generating multiplexed data by multiplexing the inputted license data on a broadcast content for a predetermined period of time; and an output unit transmitting the generated multiplexed data to a content reproduction apparatus via digital broadcast. The content reproduction apparatus includes a receiving unit receiving multiplexed data; a demultiplexer extracting license data and a broadcast content from the received multiplexed data; and a content reproduction unit reproducing the extracted broadcast content, and when obtaining a storage content whose reproduction is permitted based on the extracted license data, reproducing the obtained storage content based on the license data by switching the reproduction from the broadcast content to the storage content.

16 Claims, 18 Drawing Sheets

U.S. PATENT DOCUMENTS

| | | | |
|---|---|---|---|
| 2004/0030656 A1* | 2/2004 | Kambayashi et al. | 705/59 |
| 2004/0186853 A1* | 9/2004 | Yamamoto et al. | 707/104.1 |
| 2004/0236589 A1 | 11/2004 | Takahashi | |
| 2006/0253400 A1* | 11/2006 | Okamoto et al. | 705/57 |
| 2007/0094736 A1* | 4/2007 | Kitahara et al. | 726/26 |
| 2007/0124251 A1* | 5/2007 | Shimizu et al. | 705/59 |
| 2009/0154697 A1* | 6/2009 | Shen-Orr et al. | 380/210 |
| 2009/0158318 A1* | 6/2009 | Levy | 725/32 |

FOREIGN PATENT DOCUMENTS

| | | |
|---|---|---|
| EP | 1 229 425 | 8/2002 |
| EP | 1 439 477 | 7/2004 |
| JP | 2000-155734 | 6/2000 |
| WO | 03/017159 | 2/2003 |
| WO | 03/105475 | 12/2003 |

* cited by examiner

FIG. 5

| License ID | Linked content ID | Content obtainment information | Content key (128bit) | Usage rule |
|---|---|---|---|---|
| 0x1001 | 0xAAAA | ftp://xxx.xxx.xxx/content/0xAAAA.mpg | 0xFF..FF | Effective period (2003/12/01~ 2003/12/31) |
| 0x1002 | 0xBBBB | Scheduled streaming content Channel identifier:0x01 Broadcast period:(2003/12/02 10:00:00 ~2003/12/02 10:59:59) | 0xEE..EE | Permitted number of reproductions 10times |

FIG. 6

| License ID | License erasing flag | Distribution start time | Distribution end time |
|---|---|---|---|
| 0x1001 | TRUE | 2003/12/02 9:00:00 | 2003/12/02 9:29:59 |
| 0x1002 | TRUE | 2003/12/02 9:30:00 | 2003/12/02 9:59:59 |

FIG. 11

| Use-permitted content ID | Link source content ID | License ID | Content obtainment information | Usage rule | Content key (128bit) |
|---|---|---|---|---|---|
| 0xAAAA | 0x1111 | 0x1001 | ftp://xxx.xxx.xxx/content/0xAAAA.mpg | Effective period (2003/12/01~2003/12/31) | 0xFF..FF |
| 0xBBBB | 0x2222 | 0x2002 | Scheduled streaming content Channel identifier:0x01 Distribution period:(2003/12/24 13:00:00 ~2003/12/24 15:00:00) | — | 0xAA..AA |

FIG. 13

| Working key ID | Working key (128bit) |
|---|---|
| 0x1234 | 0x1111..1111 |
| 0x5678 | 0x2222..2222 |

FIG. 15

| Content ID | Content data |
|---|---|
| 0xAAAA | (Content data of content ID =0xAAAA) |
| 0xZZZZ | (Content data of content ID =0xZZZZ) |

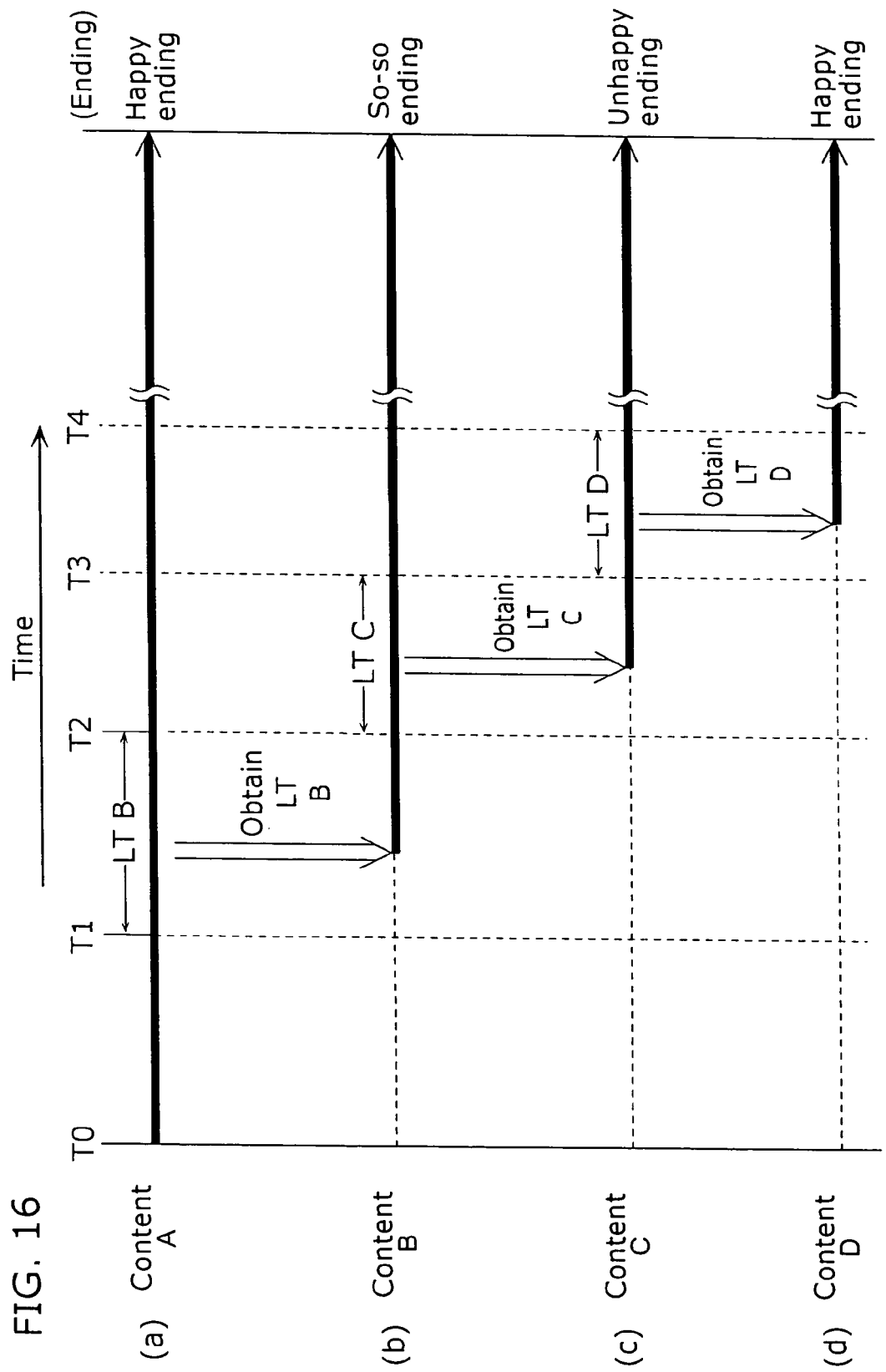

TRANSMISSION APPARATUS, CONTENT REPRODUCTION APPARATUS, AND CONTENT AND LICENSE DISTRIBUTION SYSTEM

TECHNICAL FIELD

The present invention relates to a content and license distribution system in which a transmission apparatus distributes contents on which license data that permits reproduction of the contents is multiplexed and a content reproduction apparatus reproduces the contents. It also relates to such transmission apparatus and content reproduction apparatus.

BACKGROUND ART

There is a conventional content and license distribution method for a content distribution system in which a content reproduction apparatus obtains, from a content distribution server, both a content and its license in which usage rules for allowing the use of the content are described, as single data. For example, a patent literature 1 (Japanese Laid-Open Patent Application No. 2000-155734 Publication) discloses a method for downloading content data and its license as single data from a content server.

It can be assumed in the future content distribution that a content is linked with another content and a content reproduction apparatus reproduces these contents in sequence according to the link. For example, it is assumed that a content which places a link to another content (a link source content) is a real time streaming content to be distributed according to the schedule, while a content linked from the link source content (a linked content) is a storage content which is previously downloaded to the content reproduction apparatus. It is further assumed that the license of the linked content is changed with the lapse of reproduction time of the link source content. For example, it is assumed that needs for such control may grow that although a user can reproduce the linked content only once if he/she reproduces the link source streaming content for only 10 minutes from the beginning, he/she can reproduce the linked content three times if he/she reproduces the link source content for another 10 minutes.

However, in the case where the license of a storage content is changed depending on the reproduction time of a real time streaming content to be distributed according to the schedule, as described above, the conventional method requires obtaining, from a content server, a content on which the license that varies depending upon the reproduction time of the link source content is multiplexed, which is likely to cause increase in access to the content server for obtaining such content. Furthermore, since such link source content is a real time streaming content to be distributed according to the schedule, it is likely that the accesses to the content server for obtaining the content concentrate in a specific period of time. As typically shown in the above-mentioned example, in the case where the license of a linked content is changed depending on a link source content, regardless of whether the linked content is a streaming content or a storage content, access to a content server for obtaining such content are likely to increase. So an object of the present invention is to provide a method for solving these problems.

DISCLOSURE OF INVENTION

In order to solve the above problems, the transmission apparatus according to the present invention is a transmission apparatus comprising: a license obtainment unit operable to obtain second license data that permits reproduction of a second content linked from a first content; a multiplexed data generation unit operable to generate multiplexed data by multiplexing the obtained second license data on the first content; and a transmission unit operable to transmit the generated multiplexed data to a content reproduction apparatus by streaming for a predetermined period of time.

Alternatively, in the above transmission apparatus, the transmission unit may further be operable to transmit multiplexed data generated by multiplexing second license data on the first content, the second license data permitting longer reproduction of the second content as an elapsed time from a start of the transmission of the multiplexed data including the first content becomes longer.

Furthermore, the content reproduction apparatus according to the present invention is a content reproduction apparatus that is capable of switching reproduction of a content from a streaming content which is currently being reproduced to a storage content linked from the streaming content. The apparatus comprises: a receiving unit operable to receive multiplexed data generated by multiplexing, for a predetermined period of time, second license data that permits reproduction of a second content on a first content, the first content being a streaming content and the second content being a storage content; an extracting unit operable to extract the second license data and the first content from the received multiplexed data; a content obtainment unit operable to obtain the second content whose reproduction is permitted by the extracted second license data; and a reproduction unit operable to reproduce the extracted first content, and then reproduce the obtained second content based on the second license data by switching the reproduction from the first content to the second content when the second content is obtained.

Alternatively, the above content reproduction apparatus may further comprises a content storage unit operable to previously store a storage content, wherein the content obtainment unit is operable to obtain the second content from the content storage unit in the case where the second content is stored in the content storage unit, while obtains the second content from a server via a communication network in the case where the second content is not stored in the content storage unit.

Note that not only is it possible to embody the present invention as such content and license distribution system, but also as a single unit like a transmission apparatus and a content reproduction apparatus included in the content and license distribution system, as a content and license distribution method that include, as steps, the characteristic operations in such content and license distribution system. It is also possible to embody the present invention as programs that cause a general-purpose computer such as a personal computer to execute these characteristic operations for functioning. It should be noted that such programs can be distributed on a computer-readable recording medium such as a CD-ROM and via a transmission medium such as the Internet.

As described above, according to the present invention, in the case where a broadcast content and another storage content are linked and reproduction is switched from the link source broadcast content to the linked storage content, it is possible to eliminate the flood of accesses to the license server for obtaining the license of the linked storage content by distributing, to the clients, the link source broadcast content on which the license of such linked storage content is multiplexed, even if all the clients switch the reproduction from the link source broadcast content to the linked content simultaneously.

As further information about technical background to this application, the disclosure of Japanese Patent Application No. 2003-021068 filed on Jan. 29, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing one example of data to be inputted to a license data input unit;

FIG. 6 is a diagram showing one example of a license multiplexing rule;

FIG. 11 is a diagram showing one example of license data managed by a license recording unit shown in FIG. 3;

FIG. 13 is a diagram showing one example of working key data managed by a working key management unit shown in FIG. 3;

FIG. 15 is a diagram showing one example of content data managed by the content recording unit shown in FIG. 3;

FIG. 16 is a diagram showing another example of relation between license data multiplexed according to the multiplexing rule and contents to be reproduced based on the license data;

DETAILED DESCRIPTION OF THE INVENTION

Here is a description of the embodiment of the present invention by referring to the diagrams.

Figure 1:
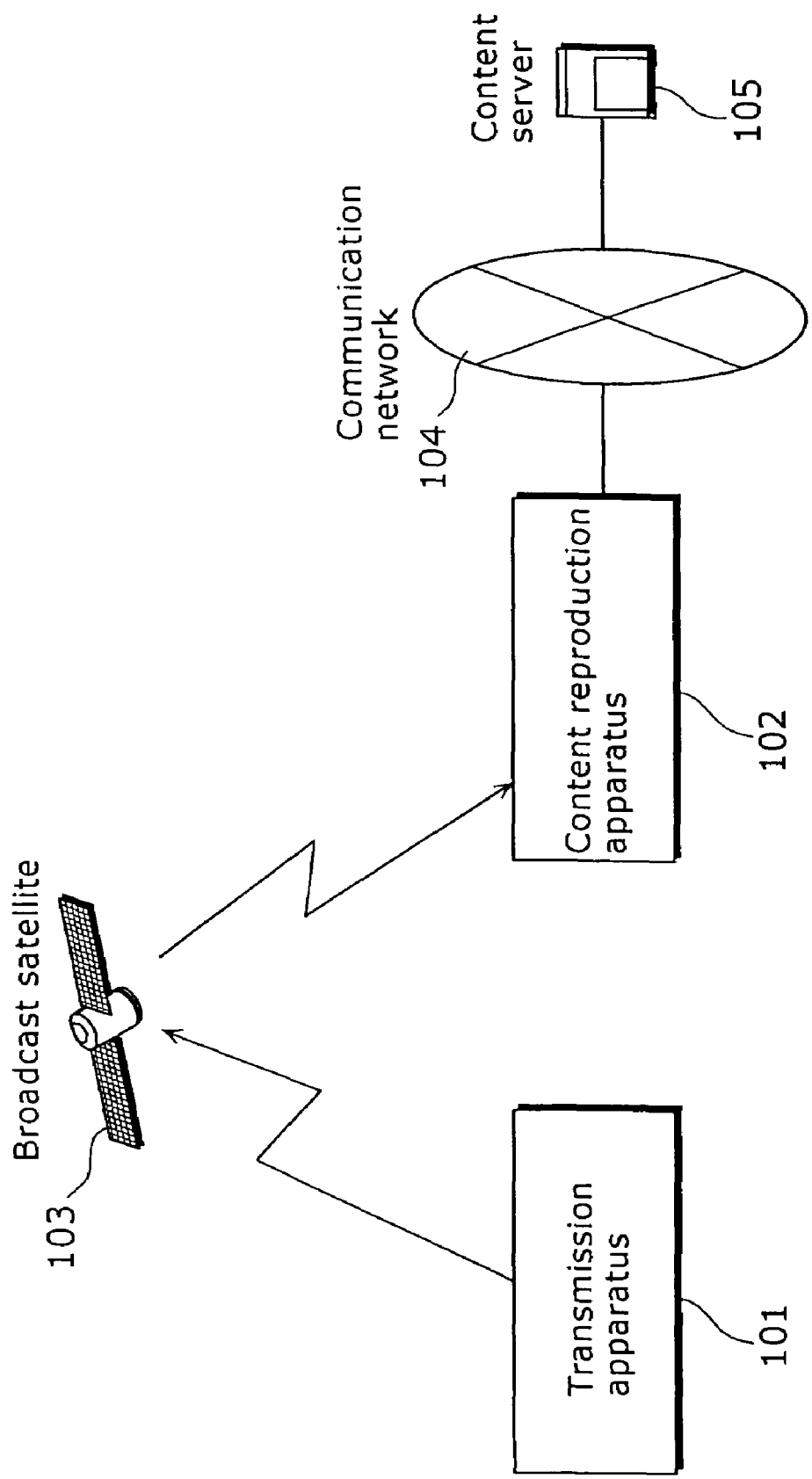
FIG. 1 is a diagram showing an outline configuration of a content and license distribution system according to an embodiment of the present invention.

FIG. 1 is a diagram showing an outline configuration of a content and license distribution system according to the present embodiment. The content and license distribution system according to the present invention is a system that allows change in content developments by switching reproduction from a broadcast content (that corresponds to a first content in the claims) which is being currently reproduced to another storage content (that corresponds to a second content and a third content in the claims) linked from the first content as the reproduction time of the first content elapses. Note that a content in the present embodiment denotes data which is obtained by digitally compressing audio and video by a compression method such as MPEG-2 and MPEG-4 (Moving Picture Experts Group) and encrypting the compressed data by an encryption method such as AES and Triple DES, if necessary. A transmission apparatus 101 for digital broadcasting multiplexes a content and a license necessary for reproduction of a content and transmits the multiplexed data to a broadcast satellite 103. In general cases, a content and license data for allowing reproduction of the content are multiplexed, but in the present embodiment, license data of another content linked from the content is also multiplexed by time division. A content reproduction apparatus 102 receives a data stream from the broadcast satellite 103, demultiplexes the multiplexed data, and reproduces the content based on the license. Contents are stored in a content server 105, and the content reproduction apparatus 102 obtains content data from the content server 105 via a communication network 104 such as the Internet.

The content distribution service using the present system is a service for providing users who subscribe in advance with an environment in which they can reproduce contents using the content reproduction apparatus 102. Contents to be distributed in this service are all encrypted, and the content reproduction apparatus 102 reproduces each of the contents after obtaining the license including the usage rules and the decryption key of the content. In the present service, contents and licenses are distributed in one of the following two methods: a method using the communication network 104 such as the Internet; and a method using the broadcast satellite 103. Furthermore, in the present service, link information indicating a link between a content and another content is included in the content, and the content reproduction apparatus 102 can specify the content to be reproduced next using the link information.

The structures of the transmission apparatus 101 and the content reproduction apparatus 102 according to the present embodiment are explained below.

Figure 2:
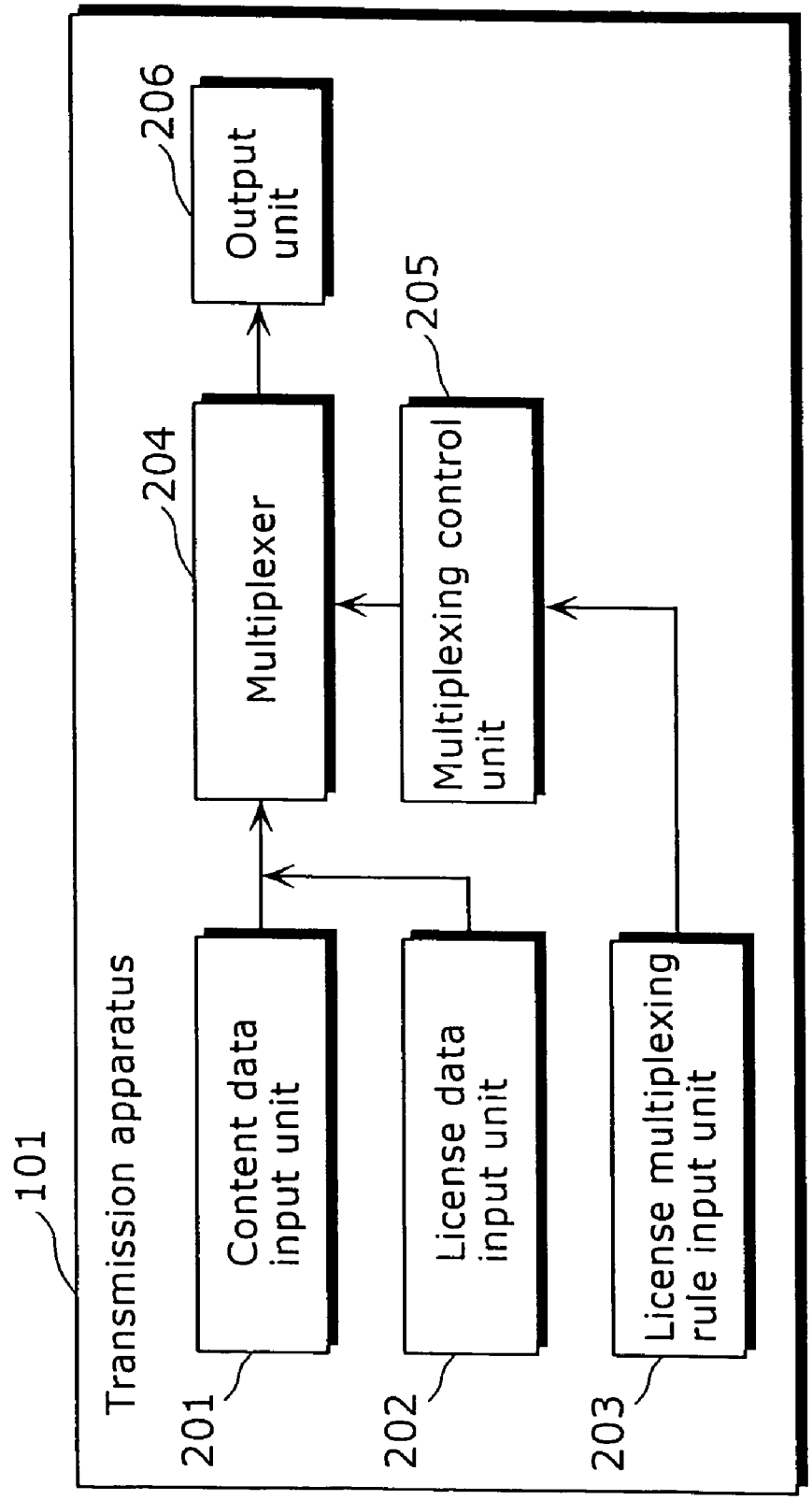
FIG. 2 is a block diagram showing a structure of a transmission apparatus shown in FIG. 1.

FIG. 2 is a block diagram showing the structure of the transmission apparatus 101 shown in FIG. 1. As shown in FIG. 2, the transmission apparatus 101 includes a content data input unit 201, a license data input unit 202, a license multiplexing rule input unit 203, a multiplexer 204, a multiplexing control unit 205 and an output unit 206. The transmission apparatus 101 is an apparatus that generates a data stream to be distributed using the broadcast satellite 103. The content data input unit 201 is a functional unit that accepts the input of previously encrypted content data and content IDs for identifying the contents uniquely. The license data input unit 202 is a functional unit that accepts the input of license data including link information for identifying contents linked from inputted contents. The license multiplexing rule input unit 203 is a functional unit that accepts the input of rules to be applied to multiplexing of content data and license data. The multiplexer 204 is a functional unit that multiplexes content data and license data so as to generate data streams. The multiplexing control unit 205 is a functional unit that controls multiplexing of data in the multiplexer 204. The output unit 206 is a functional unit that transmits the generated data stream to the broadcast satellite 103. Although a timer is needed to indicate the present time and measure elapsed time and the like when a license packet is multiplexed on a content packet in time order, a transmission apparatus for digital broadcasting is expected to be equipped with such a timer, so it is not described here by referring to the diagram.

Figure 3:
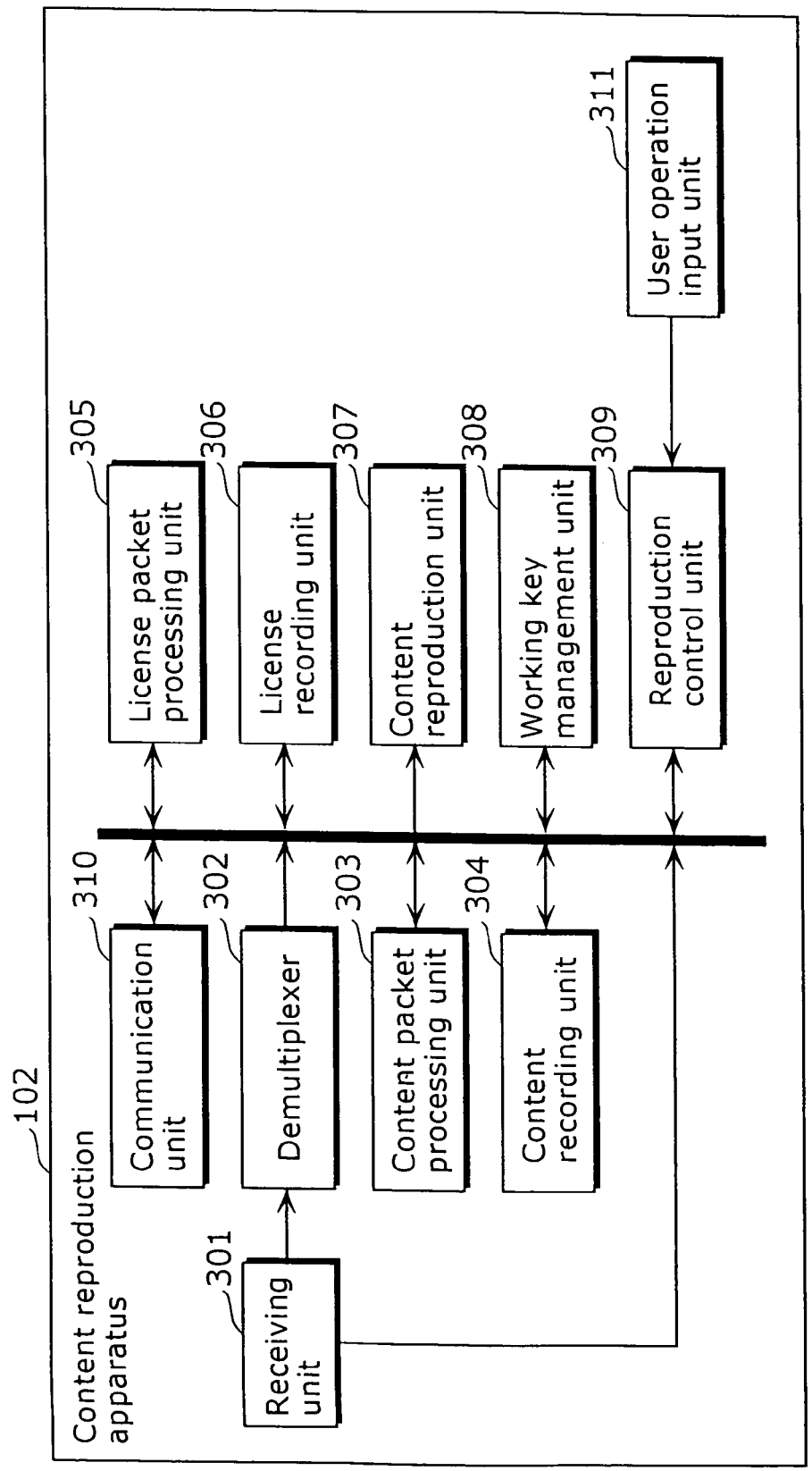
FIG. 3 is a block diagram showing one example of a structure of a content reproduction apparatus.

Next, FIG. 3 is a block diagram showing one example of the structure of the content reproduction apparatus 102. As shown in FIG. 3, the content reproduction apparatus 102 is capable of accepting the input from a user and switching reproduction from a content which is being currently reproduced to another content linked from the content. The content reproduction apparatus 102 includes a receiving unit 301, a demultiplexer 302, a content packet processing unit 303, a content recording unit 304, a license packet processing unit 305, a license recording unit 306, a content reproduction unit 307, a working key management unit 308, a reproduction control unit 309, a communication unit 310 and a user operation input unit 311. The receiving unit 301 is a functional unit that receives a data stream transmitted from the broadcast satellite 103. The demultiplexer 302 is a functional unit that demultiplexes the received data stream into a content packet and a license packet. The content packet processing unit 303 is a functional unit that performs data processing on the received content packet. The content recording unit 304 is a functional unit having a storage area in which content data of storage contents are recorded. The license packet processing unit 305 is a functional unit that performs data processing on the received license packet. The license recording unit 306 is a functional unit having a storage area in which license data is recorded. The content reproduction unit 307 is a functional unit that decrypts and decodes content data so as to reproduce the content. The working key management unit 308 is a functional unit that holds and manages a working key for decrypting license data. The reproduction control unit 309 is a functional unit that performs reproduction control of contents, such as judgment of whether or not reproduction of a content is permitted, using license data. The communication unit 310 is a functional unit that communicates with the content server 105 and the like via the communication network 104. The user operation input unit 311 is a functional unit that accepts operation inputs of the user of the content reproduction apparatus 102, such as switching of contents.

The processes performed in the transmission apparatus 101 and the content reproduction apparatus 102 for embodying the content distribution service using the present system are explained below in this order.

Figure 4:
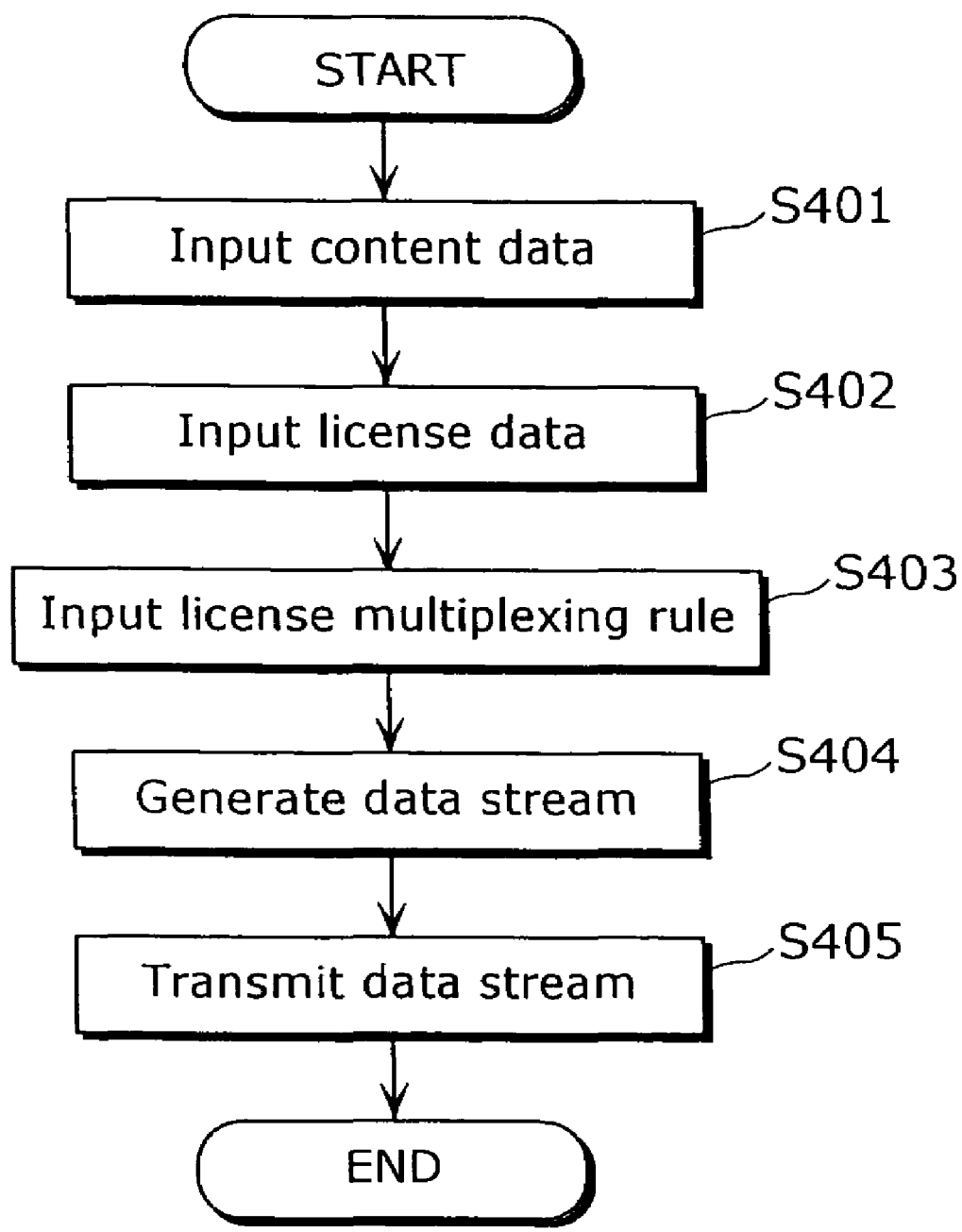
FIG. 4 is a flowchart showing operations of the transmission apparatus shown in FIG. 2.

First, the processes from generation of a data stream until transmission thereof in the transmission apparatus 101 are explained by referring to the flowchart in FIG. 4. FIG. 4 is a flowchart showing the operations of the transmission apparatus 101 shown in FIG. 2.

S401: Previously encrypted content data and its content ID are inputted to the content data input unit 201. A content ID is identification information for identifying a content uniquely.

S402: Data including link information for specifying a content (a linked content) linked from the above content and license data is inputted to the license data input unit 202. FIG. 5 is a diagram showing one example of data to be inputted to the license data input unit 202. The data to be inputted to the license data input unit 202 includes the license ID for identifying the license data, the linked content ID for identifying the linked content uniquely, the content obtainment information that is information necessary for obtaining content data, the content key for decrypting the content and the usage rules of the content. Multiple pieces of data are given, as the input, to the license data input unit 202.

FIG. 5 shows two pieces of data to be inputted to the license data input unit 202. These data are identified by the license IDs "0x1001" and "0x1002". The data identified by the license ID "0x1001" includes license data for allowing the use of the content identified by the content ID "0xAAAA". The content identified by the content ID "0xAAAA" is specified as a linked content. The content data of the linked content can be obtained at ftp://xxx.xxx.xxx/content/0xAAAA.mpg, the content key is "0xFF.FF" (128 bits), and the effective period from Dec. 1, 2003 through Dec. 31, 2003 is set as a usage rule.

FIG. 403 (FIG. 4): The rules for multiplexing the content and the license are inputted to the license multiplexing rule input unit 203. FIG. 6 is a diagram showing one example of the license multiplexing rule. To be more specific, this diagram shows an example of a multiplexing rule for multiplexing two license data on the same content in a time-staggered manner. A license multiplexing rule includes a license ID of a license to which the rule is to be applied, a license erasing flag indicating the license storage limit in the content reproduction apparatus 102 which received the license, and a distribution start time and a distribution end time indicating a period of time in which the license can be multiplexed and distributed. The multiplexing rules for all the licenses given in S402 in FIG. 4 are described and inputted to the license multiplexing rule input unit 203. The inputted license multiplexing rules are transmitted to the multiplexing control unit 205.

FIG. 6 shows a description of the license multiplexing rule for the licenses identified by the license IDs "0x1001" and "0x1002". It indicates that the license data identified by the license ID "0x1001" is multiplexed on the data stream to be transmitted during the period from 9:00:00 of Dec. 2, 2003 through 9:29:59 of Dec. 2, 2003. The license ID "0x1001" indicates that the license erasing flag for the license packet is set to "TRUE" when multiplexing. The license erasing flag "TRUE" means that the content reproduction apparatus 102 which received the license data cannot store the license identified by the license ID "0x1001" until another license linked from the same content is erased from the content reproduction apparatus 102 if it is stored there.

S404 (FIG. 4): The multiplexing control unit 205 multiplexes the content and the license data using the multiplexer 204 according to the license multiplexing rule so as to generate a data stream. Note that the license data is multiplexed after being encrypted by the working key shared with the content reproduction apparatus 102 which is to receive the content.

S405 (FIG. 4): The generated data stream is transmitted from the output unit 206.

The above is the description of the processes performed in the transmission apparatus 101.

Figure 7:
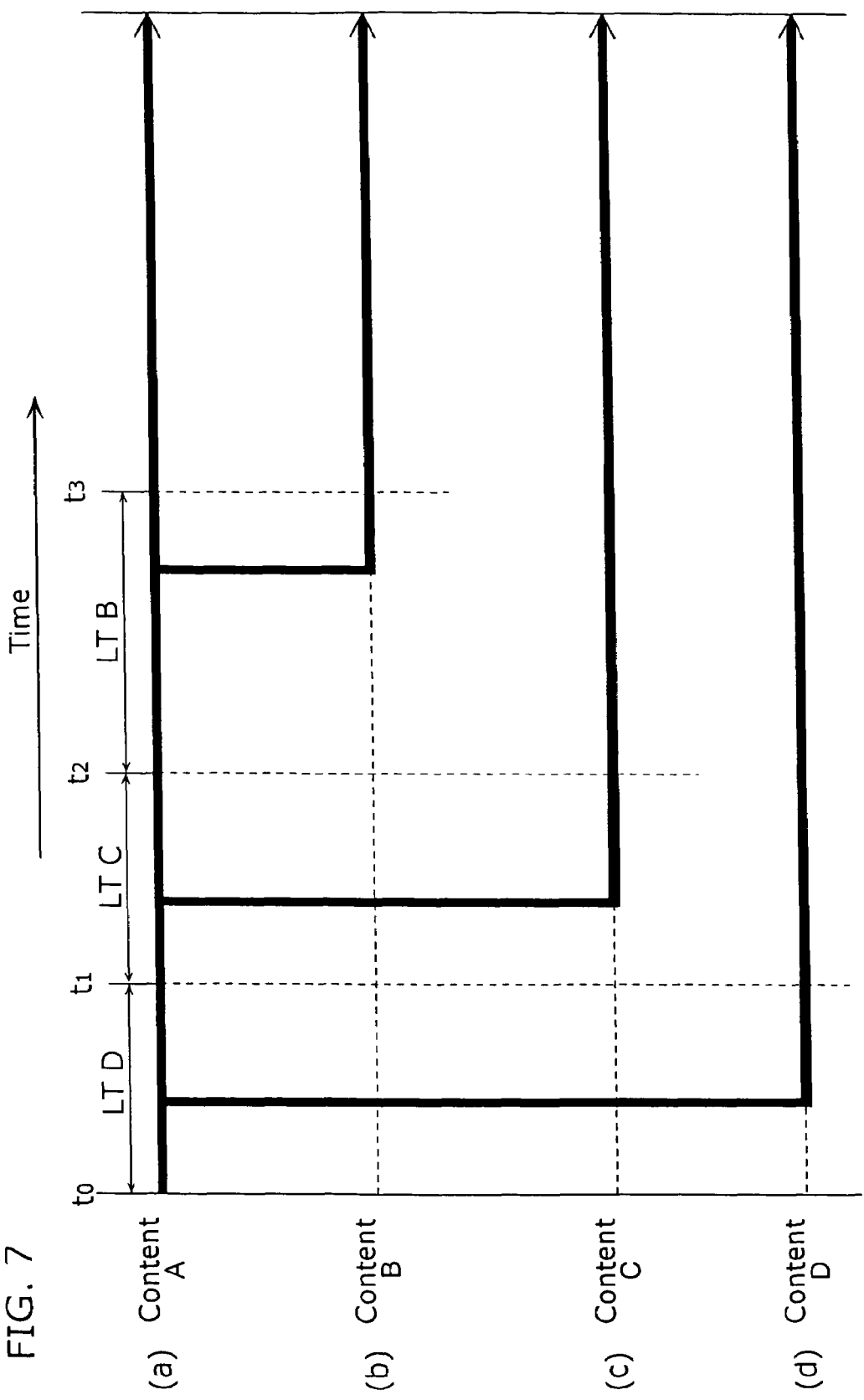
FIG. 7 is a diagram showing one example of relation between license data multiplexed according to the multiplexing rules shown in FIG. 6 and contents to be reproduced based on the license data.

FIG. 7 is a diagram showing one example of relation between the license data multiplexed according to the multiplexing rule shown in FIG. 6 and the content to be reproduced based on the license data. Here, it is assumed that a content A is a streaming content to be distributed via satellite broadcast, and contents B, C and D are previously stored in the content recording unit 304. This diagram shows that the license data of the content D which is different from the content A but linked from the content A is multiplexed on the content A and distributed in a predetermined period of time (t0 to t1) during streaming distribution of the content A. During that period of time, in the content A which is being currently reproduced in the content reproduction apparatus 102, an event for prompting a user to select whether or not the content is to be switched to another content to be reproduced next occurs so that the user can select one of the continued reproduction of the content A and the switching to the reproduction of the content D. For example, in the case where the content A is a drama or the like, "an event for prompting a user to select" means an event which predicts or explicitly indicates that the following plot development may change depending on the user's selection.

Here, if the user selects switching to the reproduction of the content D, the user operates the user operation input unit 311 to instruct the content reproduction apparatus 102 to switch to the reproduction of the content D. According to this operation, the license D is extracted from the multiplexed data. However, up to this point of time, the content reproduction apparatus 102 has reproduced the content A according to the previously obtained license A, so the license recording unit 306 holds the license A. If, the license erasing flag "TRUE" is described in the license packet of the license D, for example, the license recording unit 306 has to erase the license A therefrom. By erasing the license A from the license recording unit 306, the content reproduction apparatus 102 can store the license D into the license recording unit 306 and reproduce the content D according to the license D.

On the other hand, if the user selects the continued reproduction of the content A, he/she operates the user operation input unit 311 so as to instruct the continuation of reproduction of the content A. According to this instruction, the license recording unit 306 erases the license D extracted from the multiplexed data and continues to hold the license A. Therefore, the user can continue to view the content A according to the license A. Furthermore, in the case where the license C, the license B and the like are multiplexed on the license A and distributed in sequence after the continued reproduction of the content A is selected, the user can also select continued reproduction of the content A or the switching to the reproduction of another content such as the content C and the content B, in the same manner as mentioned above.

As described above, by erasing unwanted one of the license extracted from the multiplexed data and the originally held license on a case-by-case basis, a memory area for only one license data is required in the license recording unit 306 for a series of a plurality of contents to be reproduced, and thus the memory area can be used effectively.

Note that in the above-mentioned case, every time a new license is multiplexed, an event for inquiring a user about whether or not to switch to another content occurs, but the present invention is not limited to this method. For example, in the case were a variety of licenses are multiplexed in time order during reproduction of a content, the license recording unit 306 may capture a new license every time the new license is multiplexed if a user does nothing. In this case, if the license erasing flag is "TRUE", the license recording unit 306 may erase the previously held license and hold the new one.

Next, the processes, including receiving of a data stream, reproduction of a content and switching to reproduction of another linked content, performed in the content reproduction apparatus 102 are described below.

Figure 8:
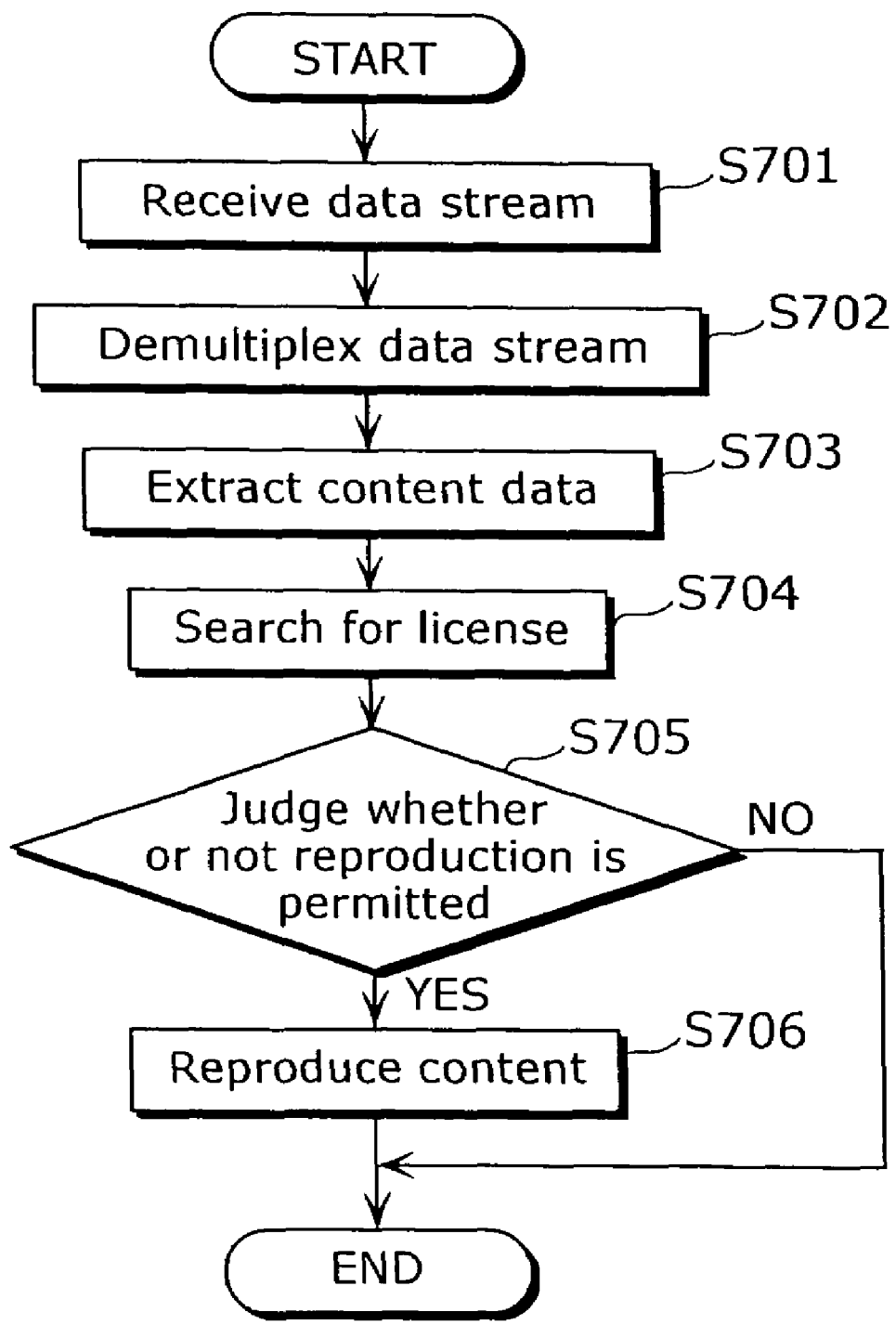
FIG. 8 is a flowchart showing operations of the content reproduction apparatus shown in FIG. 3.

The processes performed in the content reproduction apparatus 102 from a user's reproduction start request until a content reproduction start are described by referring to the flowchart in FIG. 8. FIG. 8 is a flowchart showing the operations of the content reproduction apparatus 102 shown in FIG. 3.

When a user's content reproduction start request is inputted to the user operation input unit 311, the content reproduction process is started. When starting the content reproduction, the user specifies the channel identifier of the channel on which a content to be reproduced is distributed and inputs the content reproduction start request.

S701: The content reproduction start request as well as the channel identifier are transmitted from the user operation input unit 311. The reproduction control unit 309 requests the receiving unit 301 to receive the data stream that corresponds to the specified channel identifier. The receiving unit 301 receives the data stream that corresponds to the specified channel identifier.

S702: The received data stream is transmitted from the receiving unit 301 to the demultiplexer 302, and demultiplexed into a content packet and a license packet. The data stream received in the present service includes the content packet and the license packet. The structures of the content packet and the license packet are described by referring to FIG. 9 and FIG. 10.

Figure 9:
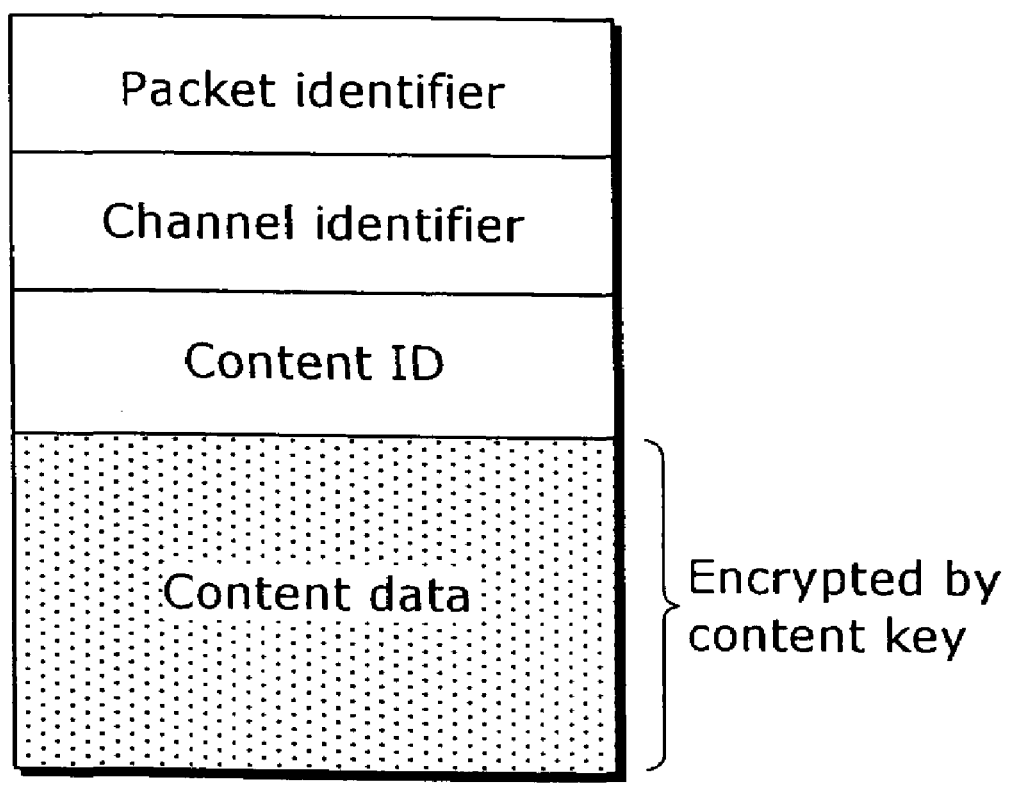
FIG. 9 is a diagram showing one example of a data structure of a content packet.

FIG. 9 is a diagram showing one example of the data structure of the content packet. The content packet includes a packet identifier, a channel identifier, a content ID and content data. The packet identifier indicates the type of the packet, and the identifier indicating a content packet is described here. The channel identifier indicates the channel on which the content is distributed. The content ID indicates the identifier for identifying the encrypted content included in the packet. The content data contains the data of the encrypted content. The above is the description of the structure of the content packet.

Figure 10:
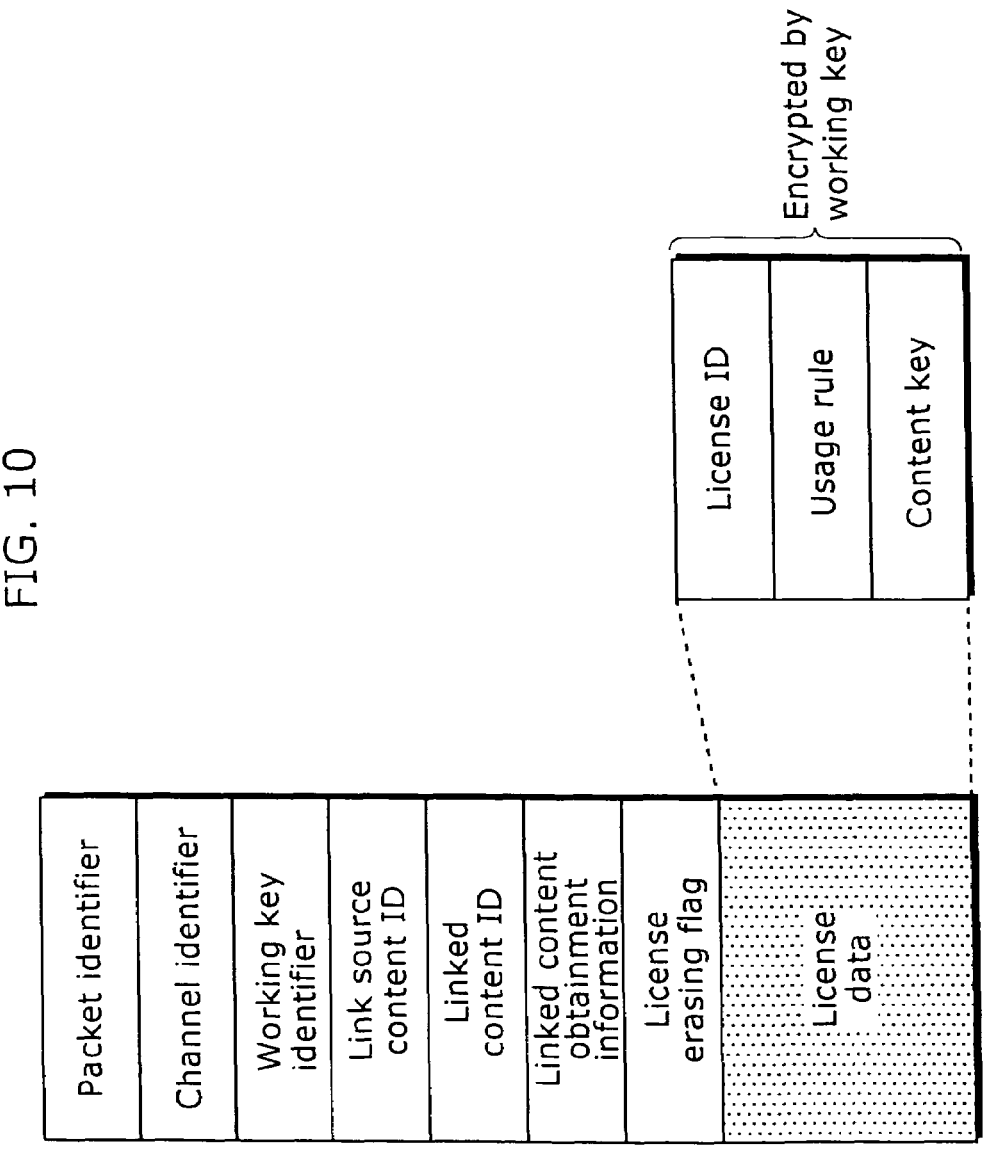
FIG. 10 is a diagram showing one example of a data structure of a license packet.

Next, FIG. 10 is a diagram showing one example of the data structure of the license packet. The license packet includes a packet identifier, a channel identifier, a working key identifier, a link source content ID, a linked content ID, linked content obtainment information, a license erasing flag and license data. The packet identifier indicates the type of the packet, and the identifier indicating a license packet is described here. The channel identifier indicates the identifier of the channel on which the license is distributed. The working key identifier is the information indicating the working key which encrypted the license. The working key is previously distributed to all users who subscribed to the content distribution service in the present system. For example, the working key is distributed by airwaves for distributing personal information or the like via satellite digital broadcasting. The link source content ID and the linked content ID are identifiers for respectively identifying the link source content and the linked content uniquely. In this case, in the link source content ID, the content ID of the content included in the content packet multiplexed as a data stream of the same channel is described. These two types of information indicate the link between the contents. In other words, they indicate that a link is placed from the content identified by the link source content ID to the content identified by the linked content ID. The linked content obtainment information indicates from where the content data identified by the linked content ID is obtained. The license erasing flag is the information indicating the license storage limit in the content reproduction apparatus 102. The license erasing flag "TRUE" means that the content reproduction apparatus 102 cannot store the license until another license linked from the same content is erased from the content reproduction apparatus 102 if it is stored there. The license erasing flag "FALSE" indicates that there is no limit on the recording of the license. The license data includes the usage rules of the content and the content key, and is encrypted by the working key. The above is the description of the structure of the license packet.

S703 (FIG. 8): The content packet demultiplexed from the data stream is transmitted to the content packet processing unit 303. The content packet processing unit 303 extracts the content ID from the obtained content data and transmits it to the reproduction control unit 309. It also transmits the content data extracted from the content packet to the content reproduction unit 307.

The processes from the receiving of the data stream until the transmission of the content packet to the content reproduction unit 307, among the processes in S701 to S703 in FIG. 8, are continued until the reproduction of the content is finished.

S704 (FIG. 8): The reproduction control unit 309 obtains the usage rules and the content key of the content from the license recording unit 306, using the obtained content ID. Note that it is assumed that the content reproduction apparatus 102 previously obtains the license for reproducing the real time streaming content to be distributed according to the schedule and records it into the license recording unit 304. FIG. 11 shows one example of data managed by the license recording unit 304. The content recording management unit 304 manages, for each license, information of a use-permitted content ID, a link source content ID, a license ID, content obtainment information, a usage rule and a content key. All these information denote "license information". The use-permitted content ID is an identifier for uniquely identifying a content that is permitted to be reproduced under the license. The link source content ID is an identifier for uniquely identifying a link source content if another content is linked from that content. The content obtainment information indicates from where the content data of that content is obtained. The usage rule indicates the condition to be satisfied when the content is reproduced. The content key indicates the decryption key for the content.

FIG. 11 shows that the licenses for permitting the use of the contents identified by the content IDs "0×AAAA" and "0×BBBB" are recorded. Here is a description of the license for the content identified by the content ID "0×BBBB". The content ID "0×BBBB" is linked from the content ID "0×2222". The license of the content ID "0×BBBB" is the license ID "0×2002", no usage rule is set, and the content key is "0×AA . . . AA" (128 bits). The content identified by the content ID "0×BBBB" is broadcasted as a scheduled streaming content on the channel identified by the channel ID "0×01" from 13:00:00 of Dec. 24, 2003 through 15:00:00 of that day. The content identified by the use-permitted content ID "0-×BBBB" is the content D in the case of FIG. 7, while the content identified by the link source content ID "0×2222" is the content A. The license identified by the license ID "0×2002" is the license D in the case of FIG. 7, which is multiplexed on the content A identified by the link source content ID "0×2222" and distributed during the period from t0 (Dec. 1, 2003) to t1 (Dec. 31, 2003). This license is identical to a new license A which is stored in the license recording unit 306 after the license A for reproducing the content A is erased from the license recording unit 306.

S705 (FIG. 8): The reproduction control unit 309 evaluates the usage rule of the obtained content and judges whether or not the content is permitted to be reproduced. If it judges that the reproduction is permitted, it transmits the content key to the content reproduction unit 307, updates the content usage rule, if necessary, and then moves to the next process S706 in FIG. 8. The update of the license denotes that updating the value described in the current license information into the value obtained by subtracting 1 from the current value, in the case where the usage rule is the permitted number of reproductions. When the reproduction control unit 309 judges that the reproduction is not permitted, it notifies the user that no more reproduction is permitted and terminates the process.

S706 (FIG. 8): The content reproduction unit 307 decrypts the content data using the content key and reproduces the content.

The above is the description of the processes performed in the content reproduction apparatus 102, from the user's reproduction start request up to the start of the content reproduction.

Next, the processes performed in the content reproduction apparatus 102 during reproduction of a content is described below.

Figure 12:
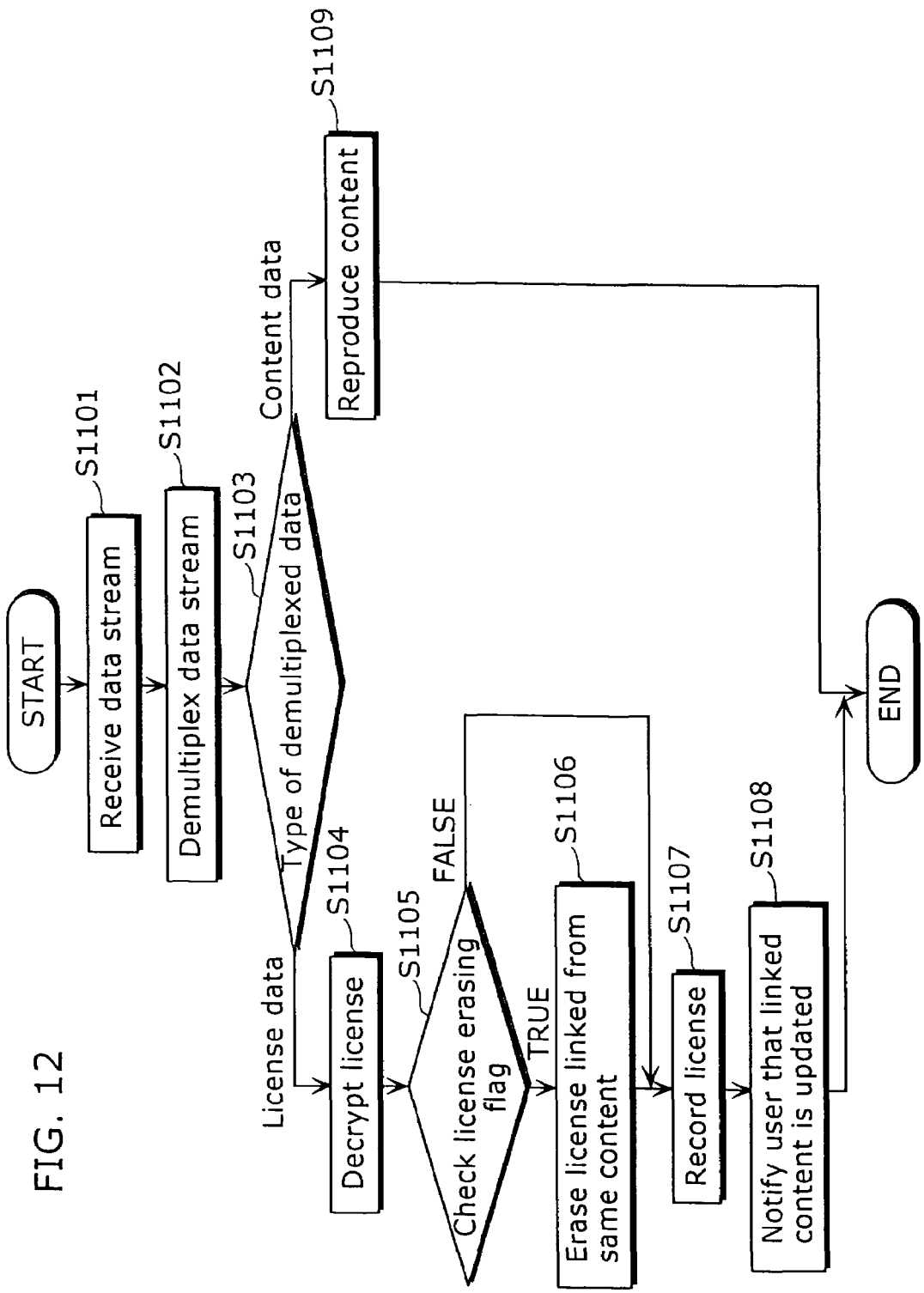
FIG. 12 is a flowchart showing operations performed in the content reproduction apparatus shown in FIG. 3 during reproduction of a content.

The processes performed in the content reproduction apparatus 102 during reproduction of a content is described by referring to the flowchart in FIG. 12. FIG. 12 is a flowchart showing the operations performed in the content reproduction apparatus 102 during reproduction of a content.

S1101: The receiving unit receives the data stream on the current channel, and transmits it to the demultiplexer 302.

S1102: The demultiplexer 302 demultiplexes the data stream into a content packet and a license packet.

S1103: According to the packet type, the demultiplexed content packet is transmitted to the content packet processing unit 303, which reproduces the content (S1109), while the demultiplexed license packet is transmitted to the license packet processing unit 305, which decrypts the license (51104).

S1104: The license packet processing unit 305 which has received the license packet obtains the working key from the working key management unit 308 using the working key identifier in the license packet. The data managed by the working key management unit 308 is described later. The license packet processing unit 305 decrypts the license in the license data using the working key obtained from the working key management unit 308, and transmits the decrypted license to the license recording unit 306. The content reproduction apparatus 102 previously obtains the working key required for the decryption of the license via broadcasting and the Internet by a secure method for preventing any tampering and tapping by a third party.

The data managed by the working key management unit 308 is described below. FIG. 13 shows one example of the data managed by the working key management unit 308. The working key management unit 308 manages working key identifiers for identifying working keys uniquely and actual data of the working keys. FIG. 13 shows that two working keys are managed. Here is a description of the data of the working key identifier "0×1234". The actual data of the working key identifier "0×1234" is "0×1111 . . . 1111" (128 bits). The above is the description of the data managed by the working key management unit 308.

S1105 (FIG. 12): The license packet processing unit 305 checks the license erasing flag in the license packet. When the license erasing flag is TRUE, it performs the process of S1106 in FIG. 12. When the license erasing flag is FALSE, it performs the process of S1107 in FIG. 12.

S1106 (FIG. 12): In the case where there exists, in the license recording unit 306, the license of the link source content ID same as the link source content ID in the license packet obtained in S1104 in FIG. 12, the license packet processing unit 305 deletes that license in the license recording unit 306.

S1107 (FIG. 12): It records the license decrypted in the S1104 in FIG. 12 into the license recording unit 306.

S1108 (FIG. 12): The license packet processing unit 305 notifies the user that the link destination of the content has been updated, and terminates the process.

S1109 in FIG. 12: The content packet processing unit 303 extracts the content data from the obtained content packet, and transmits it to the content reproduction unit 307. The content reproduction unit 307 decrypts the received content and continues to reproduce the content.

The above is the description of the processes performed in the content reproduction apparatus 102 during reproduction of a content.

Next, the processes for switching to reproduction of a linked content using link information of a current content which is being reproduced are described below. Note that the following describes the case where the license erasing flag indicates FALSE, where a license for reproducing a linked content multiplexed on a current content is stored in the license recording unit 306 at the point of time when it is distributed.

Figure 14:
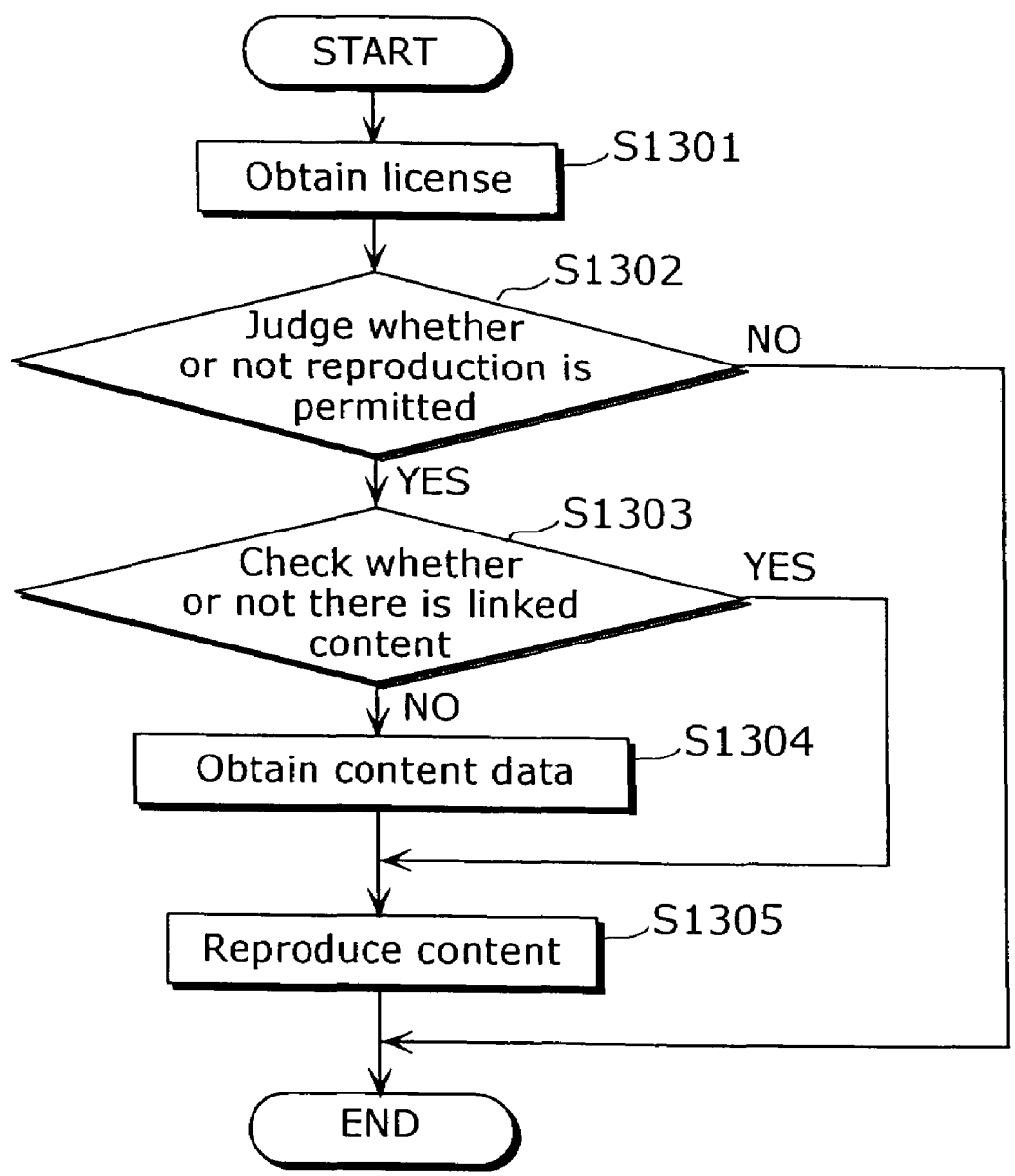
FIG. 14 is a flowchart showing operations for switching reproduction of a content in the content reproduction apparatus shown in FIG. 3.

The processes for switching to reproduction of a linked content in the content reproduction apparatus 102 are described by referring to the flowchart in FIG. 14. FIG. 14 is a flowchart showing the operations for switching reproduction of a content in the content reproduction apparatus 102.

In the content reproduction apparatus 102, a linked content reproduction request is inputted to the user operation input unit 311 by the user during reproduction of a link source content.

When the reproduction request of the content linked from the current content which is being reproduced is inputted to the user operation input unit 311, the process for switching to the content to be reproduced starts. The user specifies the content ID of the content to be reproduced when the reproduction of the linked content is started.

S1301: The user operation input unit 311 transmits the content reproduction request as well as the content ID specified by the user to the reproduction control unit 309. The reproduction control unit 309 transmits the received content ID to the license recording unit 306, and obtains the license information concerning the specified content.

S1302: The reproduction control unit 309 evaluates the usage rule of the license obtained from the license recording unit 306, and judges whether or not reproduction of the content is permitted. When it judges that the reproduction is permitted, it transmits the content key to the content reproduction unit 307 and performs the process of S1303. When it judges that the reproduction is not permitted, it notifies the user that the usage rule is not satisfied, and terminates the process.

S1303: When the linked content is a storage content, the reproduction control unit 307 checks whether or not there exists the content data in the content recording unit 304. FIG. 15 shows one example of content data managed by the content recording unit 304. The content recording unit 304 manages content IDs and content data. FIG. 15 shows that two content data are managed, and their content IDs are "0×AAAA" and "0×ZZZZ". When there are those content data in the content recording unit 304, it performs the process of S1305. When there is no such content data in the content recording unit 304 and the linked content is a scheduled streaming content, it performs the process of S1304.

S1304: The reproduction control unit 309 obtains the content data by referring to the "content obtainment information" in the license information obtained from the license recording unit 306.

If the linked content is a storage content, the reproduction control unit 309 obtains the content data from the content server 105 via the communication unit 310, and records it into the content recording unit 304.

If the linked content is a scheduled streaming content, the reproduction control unit 309 specifies the channel identifier and requests the receiving unit 301 to receive the data stream identified by the specified channel identifier. After receiving the data stream, it transmits the content data to the content reproduction unit 307 via the demultiplexer 302 and the content packet processing unit 303.

S1305: If the linked content is a storage content, the reproduction control unit 309 causes the content recording unit 304 to transmit the content data to the content reproduction unit 307.

If the linked content is a scheduled streaming content, the receiving unit 301 receives the data stream, and then transmits it to the content reproduction unit 307 via the demultiplexer 302 and the content packet processing unit 303.

The content reproduction unit 307 decrypts the content data using the content key and reproduces the content.

The above is the description of the processes for switching to reproduction of a linked content using link information of a current content which is being reproduced.

Note that the above is the description of the case where other contents are sequentially linked from one multi-story content, but the following is the description of another case where other multi-story contents are further linked from such linked content, by referring to FIGS. 16, 17 and 18. FIG. 16 is a diagram showing another example of relation between license data multiplexed according to a multiplexing rule and contents to be reproduced based on the license data. FIG. 17A is a diagram showing one example of a screen image of a content A to be reproduced during a period of time from T0 to T1. For example, this diagram shows a setting in which a big dragonfly is coming up to a woman who is hiking. As shown in FIG. 16, a license ticket (LT) B that allows reproduction of a content B is multiplexed on the content A and distributed during the period of time from T1 to T2. FIG. 17B is a diagram showing one example of a display for prompting a user to input one of options indicating what to do in the case where the user is in a situation of the woman in the content A. As shown in this diagram, during the period from T1 to T2, a screen for asking the user whether or not he/she would like to select switching to the content B is displayed, in conjunction with the distribution of the LT B. The display prompts the user to select one of the following: 1. Catch the dragonfly; and 2. Let the dragonfly go. This display does not need to be represented by text only, but voice assist may be used, or a telop may be run as the plot on the screen develops. Assuming that the selection of "2. Let the dragonfly go" in FIG. 17B corresponds to the selection of switching to the content B, the LT A in the license recording unit 306 is erased, the LT B is obtained, and the reproduction is switched from the content A to the content B. When the user selects the switching to the content B, the license A for reproducing the content A in the license recording unit 306 is erased if the license erasing flag is TRUE, so the user who selected the switching to the content B cannot reproduce the content A again.

Figure 17B:
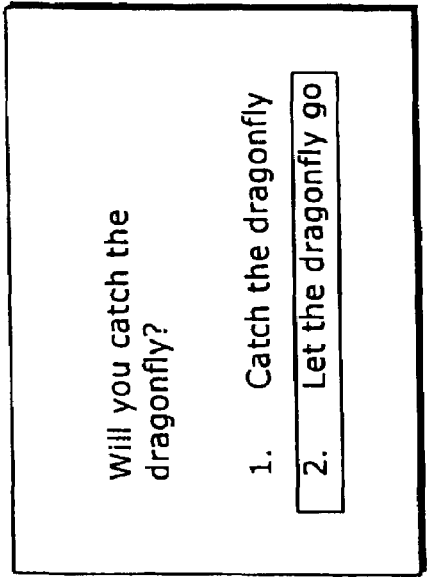
FIG. 17B is a diagram showing one example of a display for prompting a user to input one of options indicating what to do in the case where a user is in a situation of a woman in the content A.
Figure 17D:
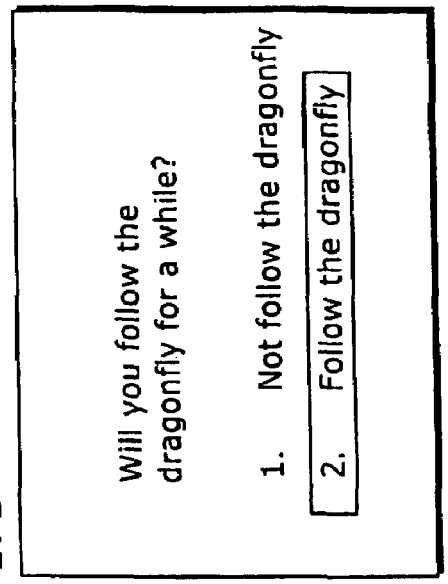
FIG. 17D is a diagram showing one example of a display for prompting the user to input one of options.
Figure 17A:
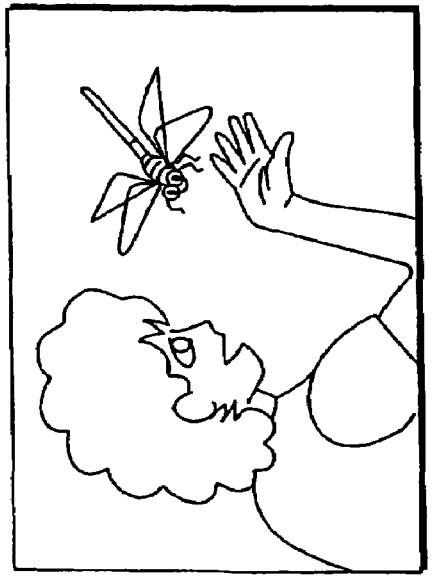
FIG. 17A is a diagram showing one example of a screen image of a content A to be reproduced during a period of time from T0 to T1.
Figure 17C:
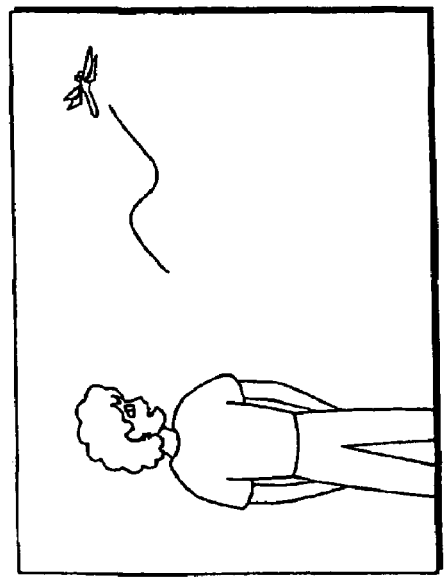
FIG. 17C is a diagram showing one example of a screen image of a content B to be reproduced until the time T2 after a license ticket (LT) B is obtained.

FIG. 17C is a diagram showing one example of the screen image of the content B to be reproduced until the time T2 after the LT B is obtained. For example, this diagram shows the screen image in which the dragonfly is flying off. A LT C that allows reproduction of a content C is multiplexed on the content B and distributed during a period of time from T2 to T3. FIG. 17D is a diagram showing one example of a display for prompting the user to input one of options. The display prompts the user to select one of the following: 1. Not follow the dragonfly; and 2. Follow the dragonfly. Assuming that the selection of "2. Follow the dragonfly" in FIG. 17D corresponds to the selection of switching to the content C, the LT B in the license recording unit 306 is erased, the LT C is obtained, and the reproduction is switched from the content B to the content C.

Figure 18A:
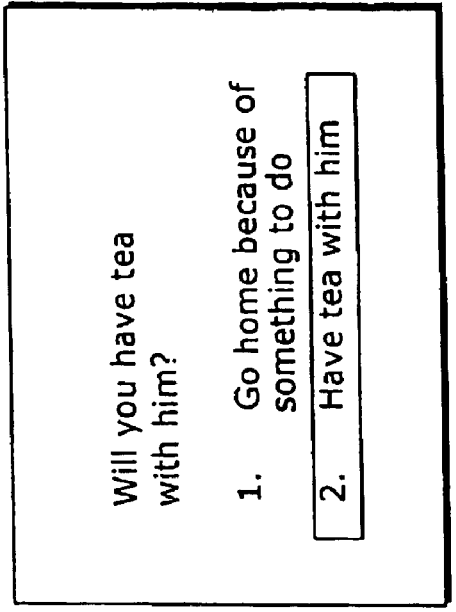
FIG. 18A is a diagram showing one example of a screen image to be reproduced until the time T3 after a LT C is obtained.
Figure 18B:
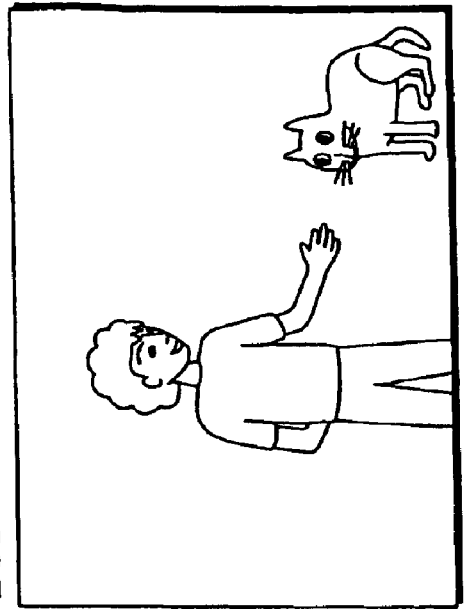
FIG. 18B is a diagram showing further another example of a display for prompting the user to input one of options.

FIG. 18A is a diagram showing one example of a screen image to be reproduced until the time T3 after a LT C is obtained. For example, this diagram shows the screen image in which the woman meets her college classmate while she is following the dragonfly. A LT D that allows reproduction of a content D is multiplexed on the content C and distributed during a period of time from T3 to T4. FIG. 18B is a diagram showing further another example of a display for prompting the user to input one of options. The display prompts the user to -select one of the following: 1. Go home because of something to do; and 2. Have tea with him. Assuming that the selection of "2. Have tea with him" in FIG. 18B corresponds to the selection of switching to the content D, the LT C in the license recording unit 306 is erased, the LT D is obtained, and the reproduction is switched from the content C to the content D.

Figure 18C:
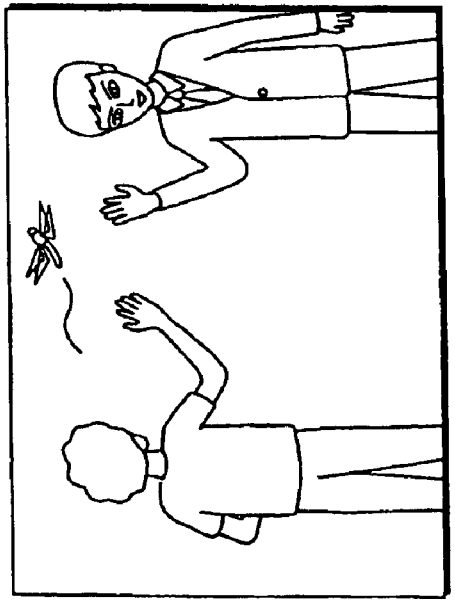
FIG. 18C is a diagram showing one example of a screen image of a content D reproduced to the end thereof after a LT D is obtained.
Figure 18D:
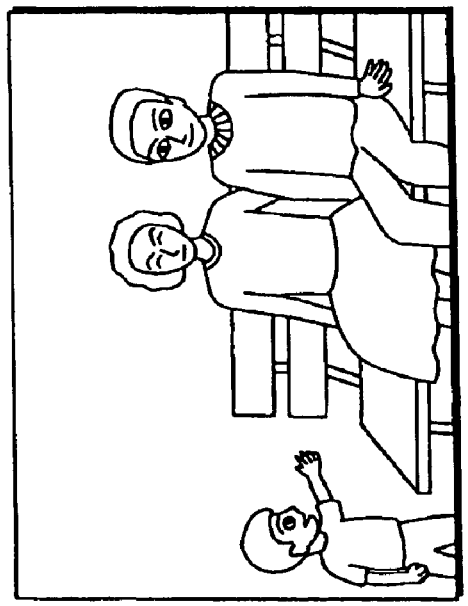
FIG. 18D is a diagram showing one example of a screen image of the content B reproduced to the end thereof after the LT B is obtained.

FIG. 18C is a diagram showing one example of the screen image of the content D reproduced to the end thereof after the LT D is obtained. For example, this diagram shows the screen image in which as a result that the woman has tea with her college classmate, they get along with each other and get married, have a child and have a good time with the child in a park. FIG. 18D is a diagram showing one example of the screen image of the content B reproduced to the end thereof after the LT B is obtained. This is the screen image reproduced in the case where the user selects "1. Not follow the dragonfly" in FIG. 17D, and in this image, for example, the woman is playing with her dog at home after hiking.

Note that the above is a description in the case where linked contents have some kind of relation with each other by taking, as an example, multi-story contents each of which has a different plot development and ending, but the contents in the present invention are not limited to such multi-story contents, or do not need to have any relation with each other. For example, it is possible to multiplex, on a link source content which a company wants to advertise, a license that allows a user who reproduced the link source content for 10 minutes or longer to reproduce another linked popular content for 30 minutes more than a user who reproduced the link source content for shorter than 10 minutes, according to the reproduction time of the link source content.

FIG. 5 shows the case where the effective period in which reproduction of a content is permitted and the permitted number of reproductions of a content are described as the usage rules. However, it is also possible to describe, in addition to these rules, any other restrictive rules of content reproduction, such as the maximum time in which reproduction of a content is permitted in total and the region code of a reproduction apparatus.

Note that in S1304 in FIG. 14, the data of the storage content obtained from the content server 105 may include a content packet of a content and a license packet of another content, like data to be distributed according to the schedule. If the data obtained from the content server 105 includes such license packet, the communication unit 310 transmits the received data to the demultiplexer 302 in S1304 in FIG. 14. The demultiplexer 302 demultiplexes the received data, and then transmits the demultiplexed content packet to the content packet processing unit 303 and the demultiplexed license packet to the license packet processing unit 305, respectively. The license packet processing unit 305 performs the same process as the process in S1104 in FIG. 12 after the license is transmitted thereto. The content packet processing unit 303 extracts the content data and records it into the content recording unit 304. After completing the processes for the content packet and the license packet, the processes in and after S1305 in FIG. 14 follow.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

The content distribution method according to the present invention is useful as a digital content distribution method and the like. The content reproduction apparatus according to the present invention is useful as a personal computer, a personal digital assistant (PDA), a cellular phone, a set top box (STB) and the like having the digital broadcast receiving function and the communication function. The transmission apparatus according to the present invention is useful as a transmission apparatus and a server for a broadcast station that distribute contents and licenses to the content reproduction apparatus via a communication network such as a satellite broadcasting network and the Internet.

The invention claimed is:

1. A transmission apparatus, comprising:
a computer-readable storage medium storing a program that when executed causes the transmission apparatus to perform as:
a second license obtainment unit configured to obtain second license data for a second content that is a content linked from a first content and a content to be stored in a content reproduction apparatus, the first content being a content to be distributed through streaming, the second license data showing a condition for permitting reproduction of the second content or showing permission for reproducing the second content;
a multiplexed data generation unit configured to generate multiplexed data by multiplexing the obtained second license data on a part of the first content; and
a transmission unit configured to transmit the generated multiplexed data to the content reproduction apparatus by streaming, the generated multiplexed data permitting longer reproduction of the second content as an elapsed time from a start of the transmission of the first content becomes longer.

2. A transmission apparatus, comprising:
a computer-readable storage medium storing a program that when executed causes the transmission apparatus to perform as:
a license obtainment unit configured to obtain second license data and third license data respectively for a second content and a third content that are linked from a first content, the first content being a content to be distributed through streaming, the second license data showing a condition for permitting reproduction of the second content or showing permission for reproducing the second content;

a multiplexed data generation unit configured to generate the multiplexed data by multiplexing the obtained second license data on a part of the first content and by multiplexing the obtained third license data on an other part of the first content, the third license data including data showing a condition for permitting reproduction of the third content or showing permission for reproducing the third content; and a transmission unit configured to transmit the generated multiplexed data to a content reproduction apparatus by streaming.

3. The transmission apparatus according to claim 2, wherein in the case where the content reproduction apparatus is permitted to store license data, said multiplexed data generation unit is configured to generate the multiplexed data by including a flag indicating prohibition of storing two or more license data of contents linked from a same content.

4. A content reproduction apparatus that is capable of switching reproduction of a content from a streaming content which is currently being reproduced to a storage content linked from the streaming content, said content reproduction apparatus comprising:

a computer-readable storage medium storing a program that when executed causes the content reproduction apparatus to perform as:

a receiving unit configured to receive multiplexed data through streaming, the multiplexed data being generated by multiplexing second license data on a part of a first content, the first content being a content to be distributed through streaming, the second license data showing a condition for permitting reproduction of a second content or showing permission for reproducing the second content, the first content being a streaming content, and the second content being a storage content;

an extracting unit configured to extract a part of the second license data and the part of the first content from the received multiplexed data and to extract the second license data from the received part of the multiplexed data;

a content obtainment unit configured to obtain the second content from a server via a communication network in the case where the second content is not stored in a content storage unit; and a reproduction unit configured to (i) perform streaming reproduction of the first content using the extracted part of the first content, and (ii) switch reproduction from the first content to the second content, when the second license data has been extracted from the received part of the multiplexed data and the reproduction of the second content is permitted according to the extracted second license data.

5. A content reproduction apparatus that is capable of switching reproduction of a content from a streaming content which is currently being reproduced to a storage content linked from the streaming content, said content reproduction apparatus comprising:

a computer-readable storage medium storing a program that when executed causes the content reproduction apparatus to perform as:

a receiving unit configured to receive multiplexed data (i) which is generated by multiplexing second license data on a part of a first content and by multiplexing third license data on an other part of the first content, and (ii) which includes a flag indicating prohibition of storing two or more license data multiplexed on one content, the first content being a streaming content, the second license data showing a condition for permitting reproduction of a second content or showing permission for reproducing the second content, the second content being a storage content, the third license data showing a condition for permitting reproduction of a third content or showing permission for reproducing the third content, and the third content being a storage content;

an extracting unit configured to extract a part of the second license data, a part of the third license data, the parts of the first content, and the flag from the received multiplexed data;

a license storage unit configured to store, according to the flag, only one license data extracted by said extracting unit; and a switching instruction acceptance unit configured to accept an input of an instruction to switch reproduction from the first content to one of the second content and the third content; and a reproduction unit configured to (i) switch reproduction from the first content to the second content, when the second license data is stored in said license storage unit at a timing of the instruction being accepted and the reproduction of the second content is permitted according to the stored second license data, and (ii) switch reproduction from the first content to the third content, when the third license data is stored in said license storage unit at a timing of the instruction being accepted and the reproduction of the third content is permitted according to the stored third license data.

6. A content reproduction apparatus that is capable of switching reproduction of a content from a streaming content which is currently being reproduced to a storage content linked from the streaming content, said content reproduction apparatus comprising;

a computer-readable storage medium storing a program that when executed causes the content reproduction apparatus to perform as:

a receiving unit configured to receive multiplexed data which is generated by multiplexing second license data on a part of a first content and by multiplexing third license data on another part of the first content;

an extracting unit configured to extract a part of the second license data, a part of the third license data, and the parts of the first content from the received multiplexed data;

a switching instruction acceptance unit configured to accept an input of an instruction to switch reproduction from the first content to one of the second content and the third content; and a reproduction unit configured to (i) switch reproduction from the first content to the second content, when the second license data is stored in said license storage unit at a timing of the instruction being accepted and the reproduction of the second content is permitted according to the stored second license data, and (ii) switch reproduction from the first content to the third content, when the third license data is stored in said license storage unit at a timing of the instruction being accepted and the reproduction of the third content is permitted according to the stored third license data.

7. A transmission method performed by a transmission apparatus, the transmission apparatus including a computer-readable storage medium storing a program that when executed performs the transmission method, the transmission method comprising:

obtaining, using a second license obtainment unit, second license data for a second content that is a content linked from a first content and a content to be stored in a content reproduction apparatus, the first content being a content to be distributed through streaming, the second license data showing a condition for permitting reproduction of the second content or showing permission for reproducing the second content;

generating, using a multiplexed data generation unit, multiplexed data by multiplexing the obtained second license data on a part of the first content; and transmitting, using a transmission unit, the generated multiplexed data to the content reproduction apparatus by streaming, the generated multiplexed data permitting longer reproduction of the second content as an elapsed time from a start of the transmission of the first content becomes longer.

8. A program stored on a computer-readable storage medium that is used in a transmission apparatus for performing data transmission, said program causing the transmission apparatus to perform steps comprising:

obtaining second license data for a second content that is a content linked from a first content and a content to be stored in a content reproduction apparatus, the first content being a content to be distributed through streaming, the second license data showing a condition for permitting reproduction of the second content or showing permission for reproducing the second content;

generating multiplexed data by multiplexing the obtained second license data on a part of the first content; and transmitting the generated multiplexed data to the content reproduction apparatus by streaming, the generated multiplexed data permitting longer reproduction of the second content as an elapsed time from a staff of the transmission of the first content becomes longer.

9. A transmission method performed by a transmission apparatus, the transmission apparatus including a computer-readable storage medium storing a program that when executed performs the transmission method, the transmission method comprising:

obtaining, using a license obtainment unit, second license data and third license data respectively for a second content and a third content that are linked from a first content, the first content being a content to be distributed through streaming, the second license data showing a condition for permitting reproduction of the second content or showing permission for reproducing the second content;

generating, using a multiplexed data generation unit, the multiplexed data by multiplexing the obtained second license data on a part of the first content and by multiplexing the obtained third license data on an other part of the first content, the third license data including data showing a condition for permitting reproduction of the third content or showing permission for reproducing the third content; and transmitting, using a transmission unit, the generated multiplexed data to a content reproduction apparatus by streaming.

10. A program stored on a computer-readable storage medium that is used in a transmission apparatus for performing data transmission, said program causing the transmission apparatus to perform steps comprising:

obtaining second license data and third license data respectively for a second content and a third content that are linked from a first content, the first content being a content to be distributed through streaming, the second license data showing a condition for permitting reproduction of the second content or showing permission for reproducing the second content;

generating the multiplexed data by multiplexing the obtained second license data on a part of the first content and by multiplexing the obtained third license data on an other part of the first content, the third license data including data showing a condition for permitting reproduction of the third content or showing permission for reproducing the third content; and transmitting the generated multiplexed data to a content reproduction apparatus by streaming.

11. A content reproduction method for switching reproduction of a content from a streaming content which is currently being reproduced to a storage content linked from the streaming content, said content reproduction method comprising:

receiving, using a receiving unit, multiplexed data through streaming, the multiplexed data being generated by multiplexing second license data on a part of a first content, the first content being a content to be distributed through streaming, the second license data showing a condition for permitting reproduction of a second content or showing permission for reproducing the second content, the first content being a streaming content, and the second content being a storage content;

extracting, using an extracting unit, a part of the second license data and the part of the first content from the received multiplexed data and extract the second license data from the received part of the multiplexed data;

obtaining, using a content obtainment unit, the second content from a server via a communication network in the case where the second content is not stored in a content storage unit; and using a reproduction unit (i) performing streaming reproduction of the first content using the extracted part of the first content, and (ii) switching reproduction from the first content to the second content, when the second license data has been extracted from the received part of the multiplexed data and the reproduction of the second content is permitted according to the extracted second license data.

12. A program stored on a computer-readable storage medium that is used in a content reproduction apparatus for performing a content reproduction method of switching reproduction of a content from a streaming content which is currently being reproduced to a storage content linked from the streaming content, said program causing the content reproduction apparatus to perform steps comprising:

receiving multiplexed data through streaming, the multiplexed data being generated by multiplexing second license data on a part of a first content, the first content being a content to be distributed through streaming, the second license data showing a condition for permitting reproduction of a second content or showing permission for reproducing the second content, the first content being a streaming content, and the second content being a storage content;

extracting a part of the second license data and the part of the first content from the received multiplexed data and to extract the second license data from the received part of the multiplexed data;

obtaining the second content from a server via a communication network in the case where the second content is not stored in a content storage unit;

performing streaming reproduction of the first content using the extracted part of the first content;

switching reproduction from the first content to the second content, when the second license data has been extracted from the received part of the multiplexed data and the reproduction of the second content is permitted according to the extracted second license data.

13. A content reproduction method for switching reproduction of a content from a streaming content which is currently being reproduced to a storage content linked from the streaming content, said content reproduction method comprising:

receiving, using a receiving unit, multiplexed data (i) which is generated by multiplexing second license data on a part of a first content and by multiplexing third license data on an other part of the first content, and (ii) which includes a flag indicating prohibition of storing two or more license data multiplexed on one content, the first content being a streaming content, the second license data showing a condition for permitting reproduction of a second content or showing permission for reproducing the second content, the second content being a storage content, the third license data showing a condition for permitting reproduction of a third content or showing permission for reproducing the third content, and the third content being a storage content;

extracting, using an extracting unit, a part of the second license data, a part of the third license data, the parts of the first content, and the flag from the received multiplexed data;

storing, using a license storage unit and according to the flag, only one license data extracted by said extracting unit; and accepting, using a switching instruction acceptance unit, an input of an instruction to switch reproduction from the first content to one of the second content and the third content; and using a reproduction unit (i) switching reproduction from the first content to the second content, when the second license data is stored in said license storage unit at a timing of the instruction being accepted and the reproduction of the second content is permitted according to the stored second license data, and (ii) switching reproduction from the first content to the third content, when the third license data is stored in said license storage unit at a timing of the instruction being accepted and the reproduction of the third content is permitted according to the stored third license data.

14. A program stored on a computer-readable storage medium that is used in a content reproduction apparatus for performing a content reproduction method of switching reproduction of a content from a streaming content which is currently being reproduced to a storage content linked from the streaming content, said program causing the content reproduction apparatus to perform steps comprising:

receiving multiplexed data (i) which is generated by multiplexing second license data on a part of a first content and by multiplexing third license data on an other part of the first content, and (ii) which includes a flag indicating prohibition of storing two or more license data multiplexed on one content, the first content being a streaming content, the second license data showing a condition for permitting reproduction of a second content or showing permission for reproducing the second content, the second content being a storage content, the third license data showing a condition for permitting reproduction of a third content or showing permission for reproducing the third content, and the third content being a storage content;

extracting a part of the second license data, a part of the third license data, the parts of the first content, and the flag from the received multiplexed data;

storing, according to the flag, only one license data extracted by said extracting unit;

accepting an input of an instruction to switch reproduction from the first content to one of the second content and the third content;

switching reproduction from the first content to the second content, when the second license data is stored in said license storage unit at a timing of the instruction being accepted and the reproduction of the second content is permitted according to the stored second license data; and switching reproduction from the first content to the third content, when the third license data is stored in said license storage unit at a timing of the instruction being accepted and the reproduction of the third content is permitted according to the stored third license data.

15. A content reproduction method for switching reproduction of a content from a streaming content which is currently being reproduced to a storage content linked from the streaming content, said content reproduction method comprising;

receiving, using a receiving unit, multiplexed data which is generated by multiplexing second license data on a part of a first content and by multiplexing third license data on another part of the first content;

extracting, using an extracting unit, a part of the second license data, a part of the third license data, and the parts of the first content from the received multiplexed data;

accepting, using a switching instruction acceptance unit, an input of an instruction to switch reproduction from the first content to one of the second content and the third content; and using a reproduction unit (i) switching reproduction from the first content to the second content, when the second license data is stored in said license storage unit at a timing of the instruction being accepted and the reproduction of the second content is permitted according to the stored second license data, and (ii) switching reproduction from the first content to the third content, when the third license data is stored in said license storage unit at a timing of the instruction being accepted and the reproduction of the third content is permitted according to the stored third license data.

16. A program stored on a computer-readable storage medium that is used in a content reproduction apparatus for performing a content reproduction method of switching reproduction of a content from a streaming content which is currently being reproduced to a storage content linked from the streaming content, said program causing the content reproduction apparatus to perform steps comprising:

receiving multiplexed data which is generated by multiplexing second license data on a part of a first content and by multiplexing third license data on another part of the first content;

extracting a part of the second license data, a part of the third license data, and the parts of the first content from the received multiplexed data;

accepting an input of an instruction to switch reproduction from the first content to one of the second content and the third content;

switching reproduction from the first content to the second content, when the second license data is stored in said license storage unit at a timing of the instruction being accepted and the reproduction of the second content is permitted according to the stored second license data; and switching reproduction from the first content to the third content, when the third license data is stored in said license storage unit at a timing of the instruction being accepted and the reproduction of the third content is permitted according to the stored third license data.

* * * * *